Reissued Jan. 15, 1952 Re. 23,451

UNITED STATES PATENT OFFICE 23,451

LAMINATED PRODUCTS AND ADHESIVE COMPOSITIONS OF MATTER

Charles J. Mighton, Madelyn Gardens, Del., assignor to E. I. du Pont de Nemours & Company, Wilmington, Del., a corporation of Delaware No Drawing. Original No. 2,561,215, dated July 17, 1951, Serial No. 626,160, November 1, 1945. Application for reissue October 20, 1951, Serial No. 252,407. In Canada June 11, 1945

13 Claims. (Cl. 154—43)

Matter enclosed in heavy brackets [ ] appears in the original patent but forms no part of this reissue specification; matter printed in italics indicates the additions made by reissue.

This invention relates to novel compositions and their use as adhesives, particularly in the bonding of textile material to rubber and other elastomers. The term "elastomer" is a generic term for all substances having the properties of natural rubber, reclaimed rubber and artificial rubber-like materials which are ordinarily termed "synthetic rubber."

This application is a continuation-in-part of my copending application Serial No. 543,202, filed July 1, 1944, now abandoned.

Many compositions have been suggested for use in the art of lamination, including combinations of rubber latex or reclaimed rubber dispersions with resinous materials. However, in certain types of lamination such as the bonding of rayon to rubber in the making of rubber tires and the like, and the bonding of rubber to metal, the adhesives heretofore suggested for use have not been completely satisfactory and, in the art of lamination generally, there is considerable room for improvement with respect to the type of adhesive to be used. There is special need for improved adhesives in the bonding of synthetic fibers such as viscose rayon and nylon fibers to rubber and the like in order to effect a tenacious bonding between the fibers and rubber, both at normal and at elevated temperatures It is an object of this invention to provide new and improved compositions of matter. A further object of the invention pertains to the production of improved adhesives. A special object of this invention is concerned with improving the adhesion between rayon and nylon cords and fabrics to rubber, particularly in the manufacture of reinforced rubber structures such as tires. Other objects will appear hereinafter.

The objects of the invention have been attained by the discovery of new compositions comprising blends of copolymers of vinyl pyridines and diene hydrocarbons, with heat convertible phenol-aldehyde resols. In utilizing the new compositions for lamination, the blend of copolymer and thermosetting resol is preferably prepared in an aqueous system, is applied to the surface of at least one of the objects to be adhered, the treated surface is brought into contact with the second component of the lamination and the resulting composite article is treated to convert the resin to the infusible state. Where the new adhesive compositions are used in the manufacture of rubber tires, they are preferably applied to the tire fabric, the rubber stock being then combined with the fabric and subjected to vulcanizing conditions, the resin being converted at the vulcanizing temperature over to the infusible state.

The following examples illustrate preferred modes of applying the principles of the invention and parts, proportions and percentages are by weight unless otherwise specified:

EXAMPLE I

A

A mixture of 75 parts of butadiene and 25 parts of alpha-vinyl pyridine is emulsified in 157 parts of an aqueous solution containing 4 parts of sodium oleate, 0.5 part of sodium hydroxide, 1 part of a formaldehyde/sodium naphthalene sulfonate condensation product, 1 part of potassium persulfate and 0.1 part of potassium ferricyanide. One half (½) part of lauryl mercaptan is added and the emulsion is heated for twenty hours at 40° C. in a sealed, glass lined vessel equipped for efficient agitation. The resulting smooth latex is treated with an antioxidant consisting of 2 parts of a phenyl-alpha-naphthylamine and diphenylamine (55:45) mixture dispersed in water. The dispersion contains about 40% solids.

B

One hundred ten (110) parts of resorcinol and 225 parts of a 40% formaldehyde solution are dissolved at 25° C. in 475 parts of water to give a 25% resol solution.

C

The above materials are used in formulating an adhesive composition as follows:

To 100 parts of a 75/25 butadiene/vinyl pyridine latex prepared as in A, 100 parts of water, 80 parts of a resorcinol/formaldehyde resol solution prepared as in B, and 0.6 part of sodium hydroxide (as a 10% aqueous solution) are added. The resulting blend is applied to a weighed strip of a square-woven nylon fabric one inch wide and five inches long, the fabric being dried for five minutes at 100° C., weighed to determine the adhesive loading, i. e. per cent dried adhesive on the basis of unimpregnated fabric, and placed adhesive side down on an unvulcanized but compounded natural or synthetic rubber stock. Formulas for the stocks used may be found in the appended Table IV. The composite is placed in a mold and heated at 140° to 145° C. until the rubber is vulcanized and the adhesive is heat-converted. The composite is then removed from [them] *the* mold, cooled and the bond strength determined by measuring the pull in pounds per inch necessary to separate the fabric and the rubber. The results of this test and of tests of similar adhesive compositions described in the examples following are shown in Table I. As a basis for comparison, a conventional blend of rubber latex with a resorcinol/formaldehyde resin gives, in this test, bonds between rubber and viscose rayon or nylon of about 20 pounds per inch at 25° C. and 5 pounds per inch or less at 100° C. Included in Table I to illustrate the superiority of the butadiene/vinyl pyridine copolymer-resorcinol/formaldehyde resin blend as an adhesive are similar blends with a 75/25 butadiene/styrene interpolymer, 70/30 butadiene/acrylonitrile copolymer and polychloroprene latex.

EXAMPLE II

A blend of 400 parts of a 75/25 butadiene/vinyl pyridine latex prepared as described in A of Example I, 400 parts of water and 4 parts of a 50% aqueous solution of sodium dibutyl dithiocarbamate with 44 parts of resorcinol, 190 parts of water, 1.2 parts of sodium hydroxide and 90 parts of a 37% aqueous formaldehyde solution is tested as an adhesive for bonding rubber to nylon and to rayon as described in C of Example I. The results with respect to nylon are shown in item 5 of Table I; bonds of 25 and 16 pounds per inch at 25° and 100° C. respectively were obtained between viscose rayon and rubber with 11% adhesive loading.

EXAMPLE III

A blend of 100 parts of a 90/10 butadiene/vinyl pyridine latex prepared in a manner similar to that of the 75/25 composition in Example I-A, 100 parts of water and 1 part of 50% aqueous sodium dibutyl dithiocarbamate with 15 parts of resorcinol, 0.5 part of sodium hydroxide, 30 parts of 37% aqueous formaldehyde solution and 100 parts of water is tested as an adhesive as described in Example I-C. The results are shown in Table I, item 6.

EXAMPLE IV

A blend of 100 parts of an 85/15 butadiene/vinyl pyridine copolymer latex prepared as described in Example I-A for the 75/25 composition, 100 parts of water and 1 part of 50% aqueous sodium dibutyl dithiocarbamate with 15 parts of resorcinol, 0.3 part of sodium hydroxide, 30 parts of 37% aqueous formaldehyde solution and 100 parts of water is tested as an adhesive as described in Example I-C. The results are shown in Table I, item 7.

EXAMPLE V

A blend of a 95/5 butadiene/vinyl pyridine copolymer latex prepared as in Example I-A with a resorcinol/formaldehyde resin is made as in Example IV and tested as an adhesive. The bonds obtained are shown in Table I, item 8.

EXAMPLE VI

A blend comprising 100 parts of a 26% latex of a 90/10 isoprene/vinyl pyridine copolymer prepared in a manner similar to Example I-A, by substituting isoprene for butadiene and employing a polymerization cycle of 40 hours at 40° C., 100 parts of water and 1 part of a 50% aqueous solution of sodium dibutyl dithiocarbamate with 15 parts of resorcinol, 30 parts of 37% aqueous formaldehyde solution, and 0.3 part of sodium hydroxide and 100 parts of water is tested as an adhesive as described in Example I-C. At 8% adhesive loading, bonds as high as 50 pounds per inch and 100 pounds per inch are obtained between nylon and rubber and a 75/25 butadiene/styrene interpolymer respectively at 25° C. At 100° C., the adhesion exceeds the tear strengths of the elastomer vulcanizates.

Table I

BONDING OF NYLON FABRIC TO RUBBERS

| | Adhesive | Rubber Stock | Loading Per Cent | Average Bonds, Lbs./Inch at— 25° C. | 100° C. |
|---|---|---|---|---|---|
| 1 | None | Rubber | | 2 | 1.5 |
| | | GR-S [1] | | 2 | 2.0 |
| 2 | Resorcinol/formaldehyde resin (Example I-B). | Rubber | 10 | 4 | —(2) |
| | | GR-S | 10 | 6 | —(2) |
| 3 | Butadiene/vinyl pyridine copolymer latex (Example I-A). | Rubber | 11 | 2 | —(2) |
| | | GR-S | 10 | 2 | —(2) |
| 4 | 75/25 butadiene/vinyl pyridine-resorcinol/formaldehyde resin (Example I-C). | Rubber | 10 | 28 | 13 |
| | | GR-S | 10 | 86[3] | (3)88 |
| 5 | 75/25 butadiene/vinyl pyridine-resorcinol/formaldehyde resin (Example II). | Rubber | 10 | 30 | 15 |
| | | GR-S | 8 | 63 | [3] 24 |
| 6 | 90/10 butadiene/vinyl pyridine-resorcinol/formaldehyde resin (Example III). | Rubber | 9 | 45 | [3] 35 |
| | | GR-S | 9 | 70 | [3] 23 |
| 7 | 85/15 butadiene/vinyl pyridine-resorcinol/formaldehyde resin (Example IV). | Rubber | 12 | 49 | [3] 39 |
| | | GR-S | 10 | 75 | [3] 23 |
| 8 | 95/5 butadiene/vinyl pyridine latex-resorcinol/formaldehyde resin (Example V). | Rubber | 11 | 20 | -------- |
| | | GR-S | 10 | 30 | -------- |
| 9 | 70/30 butadiene/acrylonitrile latex-resorcinol/formaldehyde resin (3/1). | Rubber | 8 | 3 | -------- |
| | | GR-S | 11 | 2 | -------- |
| 10 | 75/25 butadiene/styrene latex-resorcinol/formaldehyde resin (2/1). | Rubber | 5 | 3 | -------- |
| | | GR-S | 5 | 6 | -------- |
| 11 | Polychloroprene latex-resorcinol/formaldehyde resin (2/1). | Rubber | 13 | 4 | -------- |
| | | GR-S | 14 | 6 | -------- |

[1] GR-S is a commercial synthetic rubber composed approximately of a 75%-25% butadiene/styrene interpolymer prepared according to U. S. Patent No. 1,938,731.
[2] No measurable bond at 100° C.
[3] No adhesive failure; rubber stock tore.

Examples I to VI are concerned with the use, together with resols, of copolymers of dienes and alphavinyl pyridine (2-vinyl pyridine) which has the structural formula:

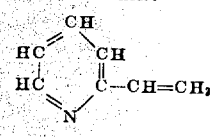

The following examples are directed to copolymers of dienes and 5-ethyl-2-vinyl pyridine, together with resols, this form of the invention being found to give excellent results. 5-ethyl-2-vinyl pyridine has the structural formula:

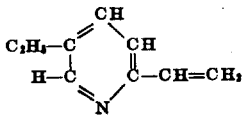

5-ethyl-2-vinyl pyridine may be prepared as follows: 5-ethyl-2-methyl pyridine (collidine) is prepared from paraldehyde and ammonia in a manner similar to that described in British Patent No. 146,689 and German Patent No. 349,184. By the treatment of 5-ethyl-2-methyl pyridine with formaldehyde according to the methods employed by Loffler and Grosse (Berichte 40,1325; 1907) for preparing 2(beta-hydroxyethyl) pyridine from alpha-picoline, 5-ethyl-2-(beta-hydroxyethyl) pyridine is formed, this latter compound being dehydrated to 5-ethyl-2-vinyl pyridine by distillation from solid sodium hydroxide in a manner similar to that described by Ladenburg (Berichte 22, 2585; 1889) for the dehydration of 2(beta-hydroxyethyl) pyridine to 2-vinyl pyridine.

EXAMPLE VII

A

A mixture of 90 parts of butadiene and 10 parts of 5-ethyl-2-vinyl pyridine is emulsified in 152 parts of an aqueous solution containing 4 parts of sodium oleate, 2 parts of sodium rosinate, 0.8 part of sodium hydroxide, 1 part of a formaldehyde/sodium naphthalene sulfonate condensation product, 1 part of potassium persulfate and 0.15 part of potassium ferricyanide. One (1) part of dodecyl mercaptan is added and the mixture in a sealed glass container is agitated end-over-end for sixteen hours in a water bath maintained at 40° C. The resulting smooth latex, containing about 35% solids, is treated with antioxidant consisting of 3 parts of phenyl-alpha-naphthylamine and diphenylamine (55:45) mixture dispersed in water.

B

A blend of 20 parts of the 90/10 butadiene/5-ethyl-2-vinylpyridine copolymer latex described above and 20 parts of distilled water, with a solution of 2 parts of resorcinol, 1 part of a 37% aqueous formaldehyde solution, 1.1 parts of an aqueous 10% sodium hydroxide solution and 20 parts of water, is applied after aging at room temperature for twenty hours to a strip of a square-woven nylon fabric, one inch wide and five inches long. The impregnated fabric is dried ten minutes at 135° C. and placed adhesive side down on an unvulcanized but compounded natural or synthetic rubber stock. Formulae for the stocks used may be found in the appended Table IV. The composite is placed in a mold and heated under 150 pounds per square inch pressure until the rubber is vulcanized and the adhesive is heat-converted. The composite is removed from the mold, cooled, and the bond strength determined by measuring the pull in pounds per inch necessary to separate the rubber and the fabric. The results of this test and of tests of similar adhesive compositions described in the examples following are shown in Table II.

EXAMPLE VIII

A

Item 2 in Table II shows the results obtained in adhesive tests of a blend of an 85/15 butadiene/5-ethyl-2-vinyl pyridine copolymer with the same resorcinol/formaldehyde resol and the same ratio of copolymer to resol as in Example VII. The copolymer was prepared in a manner similar to that of Example VII-A.

B

Item 3 in Table II shows the results of similar tests of a blend of an 80/20 butadiene/5-ethyl-2-vinyl pyridine copolymer prepared in a manner similar to Example VII-A, with the same resorcinol/formaldehyde resol in the same copolymer to resol ratio.

C

Item 4 in Table II shows the results of similar tests with a 75/25 butadiene/5-ethyl-2-vinyl pyridine copolymer in the same copolymer to resol ratio as in Example VII and with the same resol.

EXAMPLE IX

A

A mixture of 48 parts of isoprene and 12 parts of 5-ethyl-2-vinyl pyridine is emulsified in 96 parts of an aqueous solution containing 2.4 parts of sodium oleate, 1.2 parts of sodium rosinate, 0.48 part of sodium hydroxide, 0.6 part of a formaldehyde/sodium naphthalene sulfonate condensation product, 0.6 part of potassium persulfate and 0.09 part of potassium ferricyanide. Six-tenths (0.6) part of dodecyl mercaptan is added and the mixture, in a sealed glass vessel, is agitated end-over-end for thirty-six hours in a water bath maintained at 40° C. The resulting smooth latex, containing about 35% solids, is treated with an antioxidant consisting of 1.8 parts of a phenyl-alpha-naphthylamine-diphenylamine (55:45) mixture dispersed in an equal weight of water.

B

A blend of 20 parts of the 80/20 [is] isoprene/5-ethyl-2-vinyl pyridine copolymer latex described above and 20 parts of water with a solution of 2 parts of resorcinol, 1 part of a 37% formaldehyde solution, 1.1 part of an aqueous 10% sodium hydroxide solution and 20 parts of water is applied to nylon fabric and tested as an adhesive exactly as described in Example VII. The results are shown as item 5 in Table II.

EXAMPLE X

A

A mixture of 51 parts of butadiene, 9 parts of 5-ethyl-2-vinyl pyridine and 12 parts of carbon tetrachloride is emulsified in 90 parts of an aqueous solution containing 2.5 parts of the sodium salt of sulfated methyl oleate, 0.6 part of a formaldehyde/sodium naphthalene sulfonate condensation product, 0.3 part of sodium hydroxide, 0.6 part of potassium persulfate, and 0.09 part of potassium ferricyanide. The mixture, in a sealed glass container, is agitated end-over-end for twenty hours in a water bath maintained at 40° C. The resulting smooth latex, containing about 30% solids, is treated with an antioxidant consisting of 1.8 parts of phenyl-alpha-naphthylamine and diphenylamine mixture (55:45) dispersed in an equal weight of water.

B

A blend of 25 parts of the 85/15 butadiene/5-ethyl-2-vinyl pyridine copolymer latex described above and 15 parts of water with a solution of 2 parts of resorcinol, 1 part of a 37% formaldehyde solution, 1.1 parts of an aqueous 10% sodium hydroxide solution in 20 parts of water is applied to nylon fabric and tested as an adhesive exactly as described in Example VII. The results are shown as item 6 in Table II.

C

90/10 butadiene/5-ethyl-2-vinyl pyridine copolymer is prepared in a manner similar to that of Example X–A and tested in a blend with resorcinol and formaldehyde exactly as described in the preceding paragraph. The results of these adhesive tests with nylon fabric are shown as item 7 in Table II.

D

The composition described in Example X–C above was evaluated in the same way as an agent for bonding viscose rayon to rubbers. The results are shown as item 8 in Table II.

EXAMPLE XI

Twenty-five (25) parts of the 85/15 butadiene/5-ethyl-2-vinyl pyridine copolymer (isolated from the latex of Example VII–A by the addition of a suitable coagulant such as ethyl alcohol or an aqueous solution of acetic acid and sodium chloride, followed by washing the coagulum and drying it on a rubber mill) is dissolved with stirring in a mixture of 225 parts of xylene and 50 parts of methyl ethyl ketone. To 25 parts of the resulting smooth cement, a solution of 1 part of a thermosetting resin and 1 part of a solution of an accelerator for the resin setup, both in 10 parts of butanol, is added and the viscous cement is applied to fabric, dried and vulcanized to rubbers as described above. The bonds obtained are shown as item 9 in Table II.

The following examples illustrate the improved effect obtained by utilizing a blend of natural rubber with a diene/vinyl pyridine copolymer and a thermosetting phenolaldehyde resin.

EXAMPLE XII

A

A mixture of 90 parts of butadiene and 10 parts of 2-vinyl pyridine is emulsified in 157 parts of an aqueous solution containing 4 parts of sodium oleate, 2 parts of sodium rosinate, 0.5 part of sodium hydroxide, 1 part of a formaldehyde/sodium naphthalene sulfonate condensation product, 1 part of potassium persulfate and 0.1 part of potassium ferricyanide. One and one-half (1.5) parts of lauryl (dodecyl) mercaptan are added and the emulsion, in a sealed glass container, is agitated in a pressure vessel for twenty hours at 40° C. The resulting smooth latex is treated with an antioxidant consisting of 2 parts of a phenyl-alpha-naphthylamine and diphenylamine (55:45) mixture dispersed in an equal weight of water. The dispersion contains about 38% solids.

B

A solution of 3 parts of resorcinol, 1.6 parts of 37% formaldehyde solution and 1.65 parts of an aqueous 10% sodium hydroxide solution in 30 parts of distilled water is added slowly, with stirring, to a preformed mixture of 4.5 parts of concentrated natural rubber latex (60% solids), 22.5 parts of a 90/10 butadiene/2-vinylpyridine copolymer latex prepared in a manner similar to that of Example XII–A, and 33 parts of distilled water.

This blend is applied by dipping and squeezing to a strip of square-woven nylon, the fabric is dried ten minutes at 135° C. and placed adhesive side down on an unvulcanized but compounded natural or synthetic rubber stock. Formulas for the stocks used may be found in the appended Table IV. The composite is placed in a mold and heated under 150 pounds per square inch pressure until the rubber is vulcanized and the ad- Table II

BONDING OF NYLON FABRIC TO RUBBERS

[Adhesive Loadings of 7% to 10%.]

| | Adhesive | Rubber Stock | Average Bonds, Lbs./Inch at— 25° C. | 100° C. |
|---|---|---|---|---|
| 1 | 90/10 butadiene/5-ethyl-2-vinyl pyridine copolymer+1/0.7 (molar) resorcinol/formaldehyde resin (Example VII–C). | Rubber | 24 | [1] 25 |
| | | GR-S | 40 | 15 |
| 2 | 85/15 butadiene/5-ethyl-2-vinyl pyridine copolymer+1/0.7 resorcinol/formaldehyde resin (Example VIII–A). | Rubber | 46 | 25 |
| | | GR-S | [1] 57 | [1] 10 |
| 3 | 80/20 butadiene/5-ethyl-2-vinyl pyridine copolymer+1/0.7 resorcinol/formaldehyde resin (Example VIII–B). | Rubber | 30 | 22 |
| | | GR-S | 48 | [1] 10 |
| 4 | 75/25 butadiene/5-ethyl-2-vinyl pyridine copolymer+1/0.7 resorcinol/formaldehyde resin (Example VIII–C). | Rubber | 35 | 18 |
| | | GR-S | [1] 56 | [1] 15 |
| 5 | 80/20 isoprene/5-ethyl-2-vinyl pyridine copolymer+1/0.7 resorcinol/formaldehyde resin (Example IX). | Rubber | 29 | [1] 22 |
| | | GR-S | 40 | [1] 16 |
| 6 | 85/15 butadiene/5-ethyl-2-vinyl pyridine copolymer+1/0.7 resorcinol/formaldehyde resin (Example X–B). | Rubber | 60 | 34 |
| | | GR-S | [1] 65 | [1] 17 |
| 7 | 90/10 butadiene/5-ethyl-2-vinyl pyridine copolymer+1/0.7 resorcinol/formaldehyde resin (Example X–C). | Rubber | over 50 | [1] 34 |
| | | GR-S | over 50 | [1] 32 |
| 8 | 90/10 butadiene/5-ethyl-2-vinyl pyridine copolymer plus 1/0.7 resorcinol/formaldehyde resin (rayon fabric) (Example X–D). | Rubber | 45 | [1] 40 |
| | | GR-S | 50 | [1] 27 |
| 9 | 85/15 butadiene/5-ethyl-2-vinyl pyridine copolymer+phenolic resin (cement) (Example XI). | Rubber | 45 | [1] 38 |
| | | GR-S | [1] 38 | [1] 8 |

[1] Indicates failure of stock rather than adhesive.

hesive is heat-converted. The composite is then removed from the mold, cooled, and the cured bond strength measured by measuring the pull in pounds per inch necessary to separate the fabric and the rubber. The results of this test and of tests of similar adhesive compositions are shown in Table III.

Included for comparison are adhesive values obtained, both cured and uncured, for compositions of the type described in Example III (item 5 of Table III).

The "green" (uncured) adhesion to rubber of the composition above is shown by manual testing to be far better than that of a similar composition without the natural rubber latex. The following test is used to obtain quantitative measurements of "green" adhesion in the examples below:

The adhesive composition to be tested is applied to a 3 inch by 2 inch strip of close woven nylon fabric and the coated material dried in an oven for from five minutes at 100° C. to ten minutes at 135° C. This impregnated material is allowed to cool and is then applied to a 1 inch by 1.5 inch strip of uncured compounded rubber stock from which a [holland] *Holland* cloth protective coating has just been removed after warming the stock to 100° C. A thin glass cover is placed on the fabric and the assembly pressed together while the rubber stock cools, under a five pound pressure for five minutes. The weight and cover glass are then removed, the fabric-rubber laminate aged sixteen hours and the pull required to separate the rubber and fabric measured in grams per inch.

EXAMPLE XIII

In a manner similar to that of Example XII-B, 75:25, 50:50 and 40:60 mixtures (on a dry basis) of a 90/10 butadiene/2-vinylpyridine copolymer prepared in the manner of Example XII-A and natural rubber latex were blended in approximately a 3:5:1 ratio of total rubber:resin formers with a 1/0.7 (molar) resorcinol/formaldehyde resol prepared by mixing the ingredients as described in Example XII-B. The resulting adhesive compositions were tested in exactly the manner described in Example XII for both "green" and cured adhesion. The results are shown as items 2, 3 and 4 respectively in Table III.

EXAMPLE XIV

A solution of 2.3 parts of resorcinol, 1.7 parts of a 37% formaldehyde solution and 1.1 parts of aqueous 10% sodium hydroxide solution in 25 parts of distilled water is added slowly, with stirring, to a preformed blend of 12 parts of natural rubber latex concentrate (10% solids), 13.3 parts of an 85/15 butadiene/2-vinylpyridine copolymer latex containing about 40% solids and prepared in a manner similar to that of Example XIII-A, and 25 parts of distilled water.

The resulting composition is tested exactly as described in Example XII as an agent for bonding nylon fabric to rubbers. Cured bonds at 20° C. of over fifty pounds per inch between the fabric and GR-S or rubber were obtained. At 95° C., the adhesion exceeded the tear strengths of the vulcanizates.

The "green" adhesion of this composition is demonstrated by manual tests to be fully equivalent to that of the adhesive based on the 60/40 blend of natural rubber and the 90-10 butadiene-vinylpyridine copolymer of Example XIII (Table III, item 4). The "green" adhesion of a control adhesive made up according to Example IV is markedly inferior and is about equivalent to that of item 5 in Table III.

EXAMPLE XV

A solution of 2.3 parts of resorcinol, 1.8 parts of 37% formaldehyde solution and 1.1 parts of aqueous 10% sodium hydroxide solution in 25 parts of water is added slowly, with agitation, to a preformed blend of 12 parts of concentrated natural rubber [later] *latex* (60% solids), 18 parts of the 85/15 butadiene/5-ethyl-2-vinylpyridine copolymer latex prepared as described in Example X-A, and 20 parts of water. The resulting composition is applied to nylon fabric and tested for both cured and "green" adhesion as described in Example XII. The "green" adhesion is equivalent to that of item 4 in Table III. The cured bond between nylon fabric and rubber is over fifty pounds per inch at 25° C. and exceeds the tear strength of the rubber at 95° C. The bond to GR-S exceeds the tear strength of the vulcanizate at both 25° and 95° C.

A control adhesive made up as described in Example X without natural rubber latex, gives equally excellent cured bonds, but the green adhesion is inferior, approximately equal to that of item 5 in Table III.

Table III

ADHESION OF NYLON FABRIC TO RUBBERS

| | Adhesive | Cured Adhesion, Lb./In. | | | | Green Adhesion To Rubber, G./In. at 25° C. |
|---|---|---|---|---|---|---|
| | | To Rubber | | To GR-S | | |
| | | 25° C. | 95° C. | 25° C. | 95° C. | |
| 1 | 77 Butadiene/vinylpyridine copolymer (90/10); 23 natural rubber plus resorcinol and formaldehyde (Example XII). | 45 | 28 | 55 | [1] 19 | Better than control (Item 5). |
| 2 | 75:25 blend (Example XIII) | 60 | [1] 42 | 60 | [1] 26 | 245. |
| 3 | 50:50 blend (Example XIII) | 40 | 32 | 61 | [1] 32 | 850. |
| 4 | 40:60 blend (Example XIII) | 48 | [1] 38 | 55 | [1] 20 | 2,700.[2] |
| 5 | 90/10 butadiene/2-vinylpyridine plus resorcinol/formaldehyde resol. | 45 | [1] 35 | 70 | [1] 23 | 150. |
| 6 | Rubber latex/resorcinol/formaldehyde resol | 18 | 10 | 45 | [1] 20 | 3,000.[2] |

[1] Indicates failure of cured rubber stock rather than adhesive.
[2] Failure, at least in part, of uncured rubber stock rather than adhesive.

The following example is directed to copolymers of 2-methyl-5-vinylpyridine and a diene, together with resols:

EXAMPLE XVI

2-[methyl]*Methyl*-5-vinylpyridine (a methyl-substituted beta-vinylpyridine) is prepared by treating 5-ethyl-2-methylpyridine with chlorine, treating the resulting 5-(alpha-chloroethyl)-2-methyl-[ridine]*pyridine* with sodium acetate and pyrolyzing the resulting acetate. Schematically, the reactions are as follows:

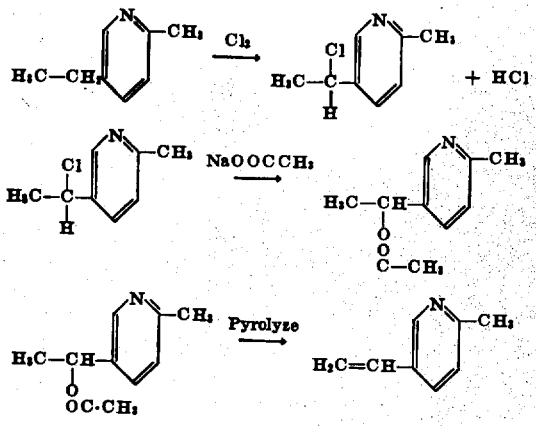

A mixture of 45 parts of butadiene, 15 parts of 2-methyl-5-vinylpyridine and 1.2 parts of rosin is emulsified in 80 parts of a solution prepared by dissolving 15.6 parts of sodium hydroxide, 48 parts of oleic acid, 12 parts of formaldehyde/sodium naphthalene sulfonate condensation product and 12 parts of potassium persulfate in 1,500 parts of water. To this emulsion is added 0.09 part of potassium ferricyanide and 0.6 part of dodecyl mercaptan. The emulsion is sealed in a glass container and rotated end-over-end for twenty-four hours in a water bath maintained at 40° C. To the resulting smooth latex, containing about 40% solids, is added 1.8 parts of a phenyl-alpha - naphthylamine - diphenylamine (55:45) mixture in the form of a dispersion in an equal weight of water.

A solution composed of 2 parts of resorcinol, 1.7 parts of a 10% aqueous soluion of sodium hydroxide, 1.05 parts of 37% aqueous formaldehyde, and 20 parts of water is added slowly, with stirring, to 20 parts of the 75/25 butadiene/2-methyl-5-vinylpyridine copolymer dispersion prepared as described above. The blend is diluted with 20 parts of water. After aging for twenty-four hours at room temperature, the blend is applied to a nylon fabric and tested as an adhesive, as described in Example I. At 25° C., bonds of forty and forty-three pounds per inch are obtained respectively, between the fabric and GR–S and between the fabric and natural rubber. At 95° C., the adhesion exceeds the tear strength of the vulcanizates.

The composition of the elastomer stocks of natural rubber and synthetic rubber (GR–S) used in the above examples is set forth in the following table.

Table IV

ELASTOMER CARCASS STOCKS EMPLOYED FOR BONDING

| | Rubber | GR–S |
|---|---|---|
| Smoked Sheets | 100 | |
| GR–S | | 100 |
| Zinc Oxide | 50 | 5 |
| Channel Black | | 32 |
| Phenyl-beta-napthylamine | 1.50 | |
| Phenyl-alpha-naphthylamine | | 1.00 |
| Sulfur | 2.75 | 1.50 |
| Stearic Acid | 2.00 | 2.00 |
| Pine Tar | 2.80 | |
| A petroleum distillate (Light Process Oil) | | 3.00 |
| Mercaptobenzthiazole | 0.75 | |
| N-cyclohexyl benzthiazyl sulphenamide | | 1.30 |

The invention broadly comprehends blends of any vinylpyridine/diene hydrocarbon copolymer and any phenol-aldehyde heat convertible resol. By phenol-aldehyde heat convertible resol is meant any condensation product of an aldehyde with a monomeric phenol which, under the influence of heat, becomes permanently infusible; these thermosetting condensation products are generally resinous in character.

The above examples specifically disclose, for forming the vinylpyridine/diene hydrocarbon copolymer, alpha-vinylpyridine (in which the pyridine ring is unsubstituted except for the vinyl group), 5-ethyl-2-vinylpyridine and 2-methyl-5-vinylpyridine. However, the invention broadly comprehends, for the production of the vinylpyridine/diene hydrocarbon copolymer, the use of alpha, beta and gamma vinylpyridines and their homologues, e. g. 5-ethyl-2-vinylpyridine, 5-propyl-2-vinyl pyridine, 5-butyl-2-vinylpyridine, 5 - hexyl - 2 - vinylpyridine, 5 - heptyl - 2 - vinylpyridine, 6-methyl-2-vinylpyridine, 4,6-dimethyl - 2 - vinylpyridine, 2-methyl-5-vinylpyridine, 2-methyl-4-vinylpyridine and other alkyl substituted vinylpyridines. Alpha vinylpyridine (2-vinylpyridine), 2-methyl-5-vinylpyridine and 5-ethyl-2-vinylpyridine are preferred.

The invention contemplates for use in the preparation of vinylpyridine/diene hydrocarbon copolymers any diene hydrocarbon, particularly polymerizable hydrocarbon dienes containing conjugated double bonds, e. g. 1,3-butadiene, isoprene, dimethylbutadiene or piperylene; of these, butadiene and isoprene are preferred, not only because of their low cost and availability, but also because of the readiness with which they copolymerize with vinylpyridines to give products possessing optimum adhesive characteristics.

The diene hydrocarbon:vinyl pyridine ratio of the copolymer operable in this invention can be varied over wide limits. For most purposes, particularly in bonding fabrics to rubbers, a pliable composition having rubber-like characteristics is preferred. Good results are obtained with copolymers in which 50% to 97% of the total is diene hydrocarbon; in general, those products consisting of 95% to 70% diene and the remainder a vinylpyridine are preferred. Three component copolymers containing at least 50% diene and 5% of a vinylpyridine, the remainder consisting of other vinyl or vinylidene compounds or butenedioic acids or esters, such as styrene, dimethyl (vinylethinyl) carbinol, vinylidene chloride, methyl vinyl ketone, vinyl naphthalene, methyl methacrylate, acrylonitrile or diethyl fumarate and the like are also operable and are included.

In forming the diene hydrocarbon-vinylpyridine copolymer, a pH preferably in excess of 7.0 is used, the pH at the beginning of the copolymerization preferably being 10.0 to 12.0. Also, although it is preferred to use the aqueous emulsion method for forming the diene hydrocarbon/vinylpyridine copolymer, one may dissolve the monomers and effect the reaction in solution, or one may merely mix the monomers in bulk (without solvent or dispersing medium) and cause the reaction to proceed. Example I–A illustrates a typical method for preparing the copolymer in an aqueous medium, but the conditions can, of course be varied in accordance with the knowledge of those skilled in the art.

It will be understood however that the invention is not limited as to the manner or conditions of preparing the diene-vinylpyridine copolymer. Thus, in place of sodium oleate, one may use other alkaline dispersing agents such as alkali metal or ammonium, or substituted ammonium salts of long chain carboxylic acids such as oleic acid or rosin, e. g. potassium oleate and sodium resinate, long chain sulfonic acids, salts of long chain betaines, or salts of long chain alcohol sulfates, or combinations of any of these dispersing agents, alkali metal or ammonium oleates, rosinates or sulfonates being preferred. In place of the formaldehyde/sodium naphthalenesulfonate condensation product described above and which functions to add stability to the emulsion, one may use other well known protective colloids. While emulsion systems are in general preferred for convenience in preparing aqueous adhesive formulations, one may use bulk, solution or granulation polymerization techniques. Suitable polymerization initiators or catalysts include peroxides such as benzoyl peroxide, lauroyl peroxides and hydrogen peroxide, inorganic percompounds such as alkali metal perborates and persulfates, potassium persulfate being the preferred polymerization initiator. In place of potassium ferricyanide which functions to activate the catalytic action of the potassium persulfate used in the examples, one may use other catalyst activators such as alkali metal ferrocyanides and readily oxidizable sulfoxy compounds such as sodium hydrosulfite, sodium bisulfite, sodium pyrosulfite and the like. Where an organic peroxide such as benzoyl peroxide is used, activators are normally not used.

The use of modifiers such as carbon tetrachloride, 5,5,5-trichloroamyl mercaptan and long chain unsubstituted mercaptans such as the lauryl mercaptan (dodecanethiol) of Example I–A, octyl and decyl mercaptans or other commercially available mercaptans predominating in octyl, decyl and higher mercaptans, dialkyl xanthogen disulfides, sulfur and other modifiers, is optional in the polymerization mixture, but is preferred because of the improved green adhesion or ability to hold the lamination securely in place before the rubber stock is cured.

The polymerization [temeprature] *temperature* may be varied within wide limits, for example 0° to 100° C., but in general temperatures of 30° to 60° C. are preferred. The time required to obtain a high yield of polymerizate will depend on the temperature, catalyst and system, e. g. emulsion system, used. The reaction time may be much greater or less than twenty hours, a shorter period ordinarily being used where the reaction is carried out at the higher temperatures.

The smooth latex resulting from polymerization may be stabilized in any convenient manner. The addition of an aromatic amine, preferably in the form of a dispersion, e. g. phenyl-alpha-naphthylamine or the phenyl-alpha-naphthylamine-diphenylamine of Example I–A, serves to stabilize the rubber in the latex or aqueous dispersion until it is ready to be used.

In place of formaldehyde, there can be used for the preparation of the heat convertible resols other aldehydes and materials which, under the conditions of reaction, liberate formaldehyde in the preparation of the thermosetting aldehyde resols. Examples of such materials are paraformaldehyde, hexamethylenetetramine, acetaldehyde, butyraldehyde, chloral, furfural and salicylaldehyde; formaldehyde, or materials which readily liberate formaldehyde, are preferred.

The phenols used for the preparation of the thermosetting aldehyde-phenol resol can be monohydric or polyhydric phenols or mixtures of these. Examples of monohydric phenols are phenol, the cresols, the xylenols and the naphthols, and their condensation products with aldehydes or ketones, e. g. diphenylomethane or diphenylolpropane; halogen- or alkyl-substituted phenols such as chlorophenols, tertiary-butyl phenol and tertiary-amyl phenol. Examples of polyhydric phenols are resorcinol, catechol, phloroglucinol, orcinol and hydroquinone as well as natural products containing polyhydric phenolic groups such as quebracho extract. The preferred phenols are the mononuclear polyhydric phenols, particularly resorcinol, since they provide, in general, superior adhesion.

The particular resins most useful in the practice of the invention are heat convertible resorcinol/formaldehyde resols. The thermosetting resorcinol/formaldehyde resol may be made of mixtures having resorcinol/formaldehyde mol ratios of from 3:1 to 1:10. In general, those containing about 0.7 to three mols of formaldehyde per mol of resorcinol are preferred. Aldehyde liberating substances such as hexamethylenetetramine may be employed to replace part of the aldehyde, but, in general, it is preferred to operate without them.

The inclusion of rubber latex, together with the diene/vinylpyridine copolymer and thermosetting resol is of particular advantage in view of the excellent adhesion effected by such compositions before curing of the rubber ("green" adhesion) as well as good final (cured) adhesion. Any good quality natural rubber may be used for this purpose, Hevea rubber latex, either normal, dilute or concentrated, being preferred for the preferred aqueous adhesion systems.

The amount of natural rubber latex used in admixture with the copolymer, depending on the amount of green adhesion desired, may vary from 5% to 80% of the combined natural rubber and copolymer with little or no loss in cured adhesion. Compositions containing from 30% to 70% of natural rubber latex are in general preferred. Amounts below 30% give only minor improvements in green adhesion over similar compositions without rubber latex, which improvements are frequently not satisfactory for many processing operations. If more than 70% of natural rubber latex be used, somewhat lower cured bonds will result at the low adhesive loadings which give excellent results with compositions containing less natural rubber. Particularly noteworthy is the large increase in green adhesion obtained by increasing the amount of natural rubber from 50% to 60% (items 3 and 4 in Table III), almost up to the level of compositions containing only rubber latex with the resorcinol/formaldehyde resin. This great increase in green adhesion is made without any serious loss in cured bond strength over the 50:50 natural rubber/copolymer composition, or even over compositions containing only copolymer, resorcinol and formaldehyde, which is a surprising and unpredictable result.

In the practice of this invention, blends of the diene hydrocarbon/vinylpyridine copolymer and the resin containing from 10% to 90% resin may be employed. In general, for tire cord application, it is preferred to operate within the range of 20% to 60% resin, particularly from 25% to 40% resin. It is also preferred to use the adhesive in the alkaline state, i. e. at a pH above 7.0.

In addition to the copolymer, resin, rubber and the other materials discussed above as suitable addition agents, the adhesive composition may contain fillers such as carbon black, vulcanizing and compounding ingredients such as sulfur, zinc oxide, rubber accelerators, softeners, plasticizers, tack producing agents other than natural rubber and the like, suitably dispersed or dissolved in the blend.

The use of an aqueous system for the blending and practical application of the adhesive is preferred for convenience and economy. Solutions or dispersions of the copolymer and the resin in suitable organic solvents such as toluene, toluene-ethyl alcohol mixtures, or chlorinated aliphatics however may be used.

As illustrated in the examples, the resorcinol/formaldehyde component or resol may be prepared by the simple solution of the resorcinol and formaldehyde in water or an alkaline material such as sodium hydroxide may be added for the purpose of advancing the condensation which proceeds readily in alkaline solution. Alternatively, as pointed out in Example II and other examples, the resol may be formed by adding the phenol and aldehyde to the butadiene/vinylpyridine emulsion as in Example II, preferably in the presence of sodium hydroxide or equivalent alkali. The sodium dibutyl dithiocarbamate used in Example II and in other examples functions as a vulcanization accelerator, but its presence is entirely optional especially since the accelerator in the rubber stock in all probability migrates to the adhesive.

The lamination procedure may be varied considerably. Generally speaking however, the temperature used for curing the thermosetting resol is about 100° to 200° C. and where the lamination involves the plying of the rubber to other things such as metal, cotton or synthetic fibers for example, the unvulcanized rubber stock will be vulcanized at a temperature within this range, thereby making unnecessary a separate heating step for converting the resin to the infusible state. By proper formulation of the rubber stock and adhesive, the compositions can be made to laminate at ordinary temperatures. It is preferred that the adhesive be dried as described in Example I–C after its application to one of the elements to be laminated and before the second element to be laminated is brought into contact with the element containing the adhesive. Also, an improvement in bond strength is noted when either the resol solution or the blend of diene hydrocarbon/vinylpyridine and resol is set aside to age for a period before application as an adhesive; as is described in Example VII, this aging period may be twenty hours, but a greater or less period, e. g. one hour up to forty-eight hours may be used with advantage. This aging period is particularly beneficial where the resol comprises resorcinol to formaldehyde in the mol ratio of 1:0.7.

As will be noted from the above description, the compositions of this invention, when used as adhesives, provide an excellent bond not only at ordinary temperatures, but also at elevated temperatures.

While the adhesive is particularly suited for bonding cotton, viscose rayon and nylon fabrics to rubbers such as natural rubber, GR–S, neoprene, butadiene/acrylonitrile rubber and other diene copolymer rubbers as in the manufacture of tires, belts, coated fabrics and other articles, it may be used in other applications such as bonding metals, wood, paper, ceramics, glass, leather or plastics to each other or to rubber. In view of the great utility of the compositions embodied in the present invention for improving adhesion, this phase of the invention has been particularly emphasized, but it will be understood that the novel compositions may also be used generally as film-forming components of coating compositions and as binders in molding compositions.

The term "copolymer" as used herein signifies a polymer containing in its polymer molecule units of more than one monomeric material, e. g. the polymer obtained by polymerizing together both monomeric vinylpyridine and monomeric butadiene; the term is not intended to include physical mixtures of different polymers.

The practice of the invention is capable of considerable modification and any variation which conforms to the principles of the invention is intended to be included within the scope of the claims.

I claim:

1. An adhesive comprising a copolymer of a diene hydrocarbon containing conjugated double bonds and a member of the class consisting of unsubstituted monovinylpyridines and alkyl substituted monovinylpyridines, the said hydrocarbon being present in amounts of 50% to 95% by weight of said copolymer and the vinylpyridine being present in amounts at least 5% by weight of said copolymer in admixture with a heat convertible polyhydric phenolaldehyde resol, the amount of said resol in said adhesive being from 20% to 60% [by weight of said adhesive] *of the combined weights of said copolymer and said resol.*

2. An adhesive comprising a copolymer of a diene hydrocarbon containing conjugated double bonds and a member of the class consisting of unsubstituted monovinylpyridines and alkyl substituted monovinylpyridines, the said hydrocarbon being present in amounts of 50% to 95% by weight of said copolymer and the vinylpyridine being present in amounts at least 5% by weight of said copolymer in admixture with a heat convertible resorcinol-aldehyde resol, the amount of said resol in said adhesive being from 20% to 60% [by weight of said adhesive] *of the combined weights of said copolymer and said resol.*

3. An adhesive comprising a copolymer of a butadiene hydrocarbon containing conjugated double bonds and a member of the class consisting of unsubstituted monovinylpyridines and alkyl substituted monovinylpyridines, the said hydrocarbon being present in amounts of 50% to 95% by weight of said copolymer and the vinylpyridine being present in amounts at least 5% by weight of said copolymer in admixture with a heat convertible resorcinol-aldehyde resol, the amount of said resol in said adhesive being from 20% to 60% [by weight of said adhesive] *of the combined weights of said copolymer and said resol.*

4. A laminated article comprising a solid material bonded to a solid material by an adhesive comprised of a copolymer of a diene hydrocarbon containing conjugated double bonds and a member of the class consisting of unsubstituted monovinylpyridines and alkyl substituted monovinylpyridines, the said hydrocarbon being present in amounts of 50% to 95% by weight of said copolymer and the vinylpyridine being present in amounts at least 5% by weight of said copolymer in admixture with an infusible polyhydric phenolaldehyde resin formed from a heat convertible resin previously blended with said copolymer, the amount of said resin being from 20% to 60% [by weight of said adhesive] *of the combined weights of said copolymer and said resin.*

5. An article in accordance with claim 4 in which the said resin is a resorcinol-aldehyde resin.

6. An article in accordance with claim 4 in which a material is bonded to an elastomer by said adhesive.

7. An article in accordance with claim 4 in which a fibrous material is bonded to an elastomer by said adhesive.

8. A laminated article comprising a solid material bonded to a solid material by an adhesive composed of a butadiene/vinyl pyridine copolymer in which butadiene makes up 50% to 95% of said copolymer and the vinylpyridine being present in amounts at least 5% by weight of said copolymer in admixture with a resorcinol-aldehyde resin formed from a heat-convertible resin previously blended with said copolymer, the resorcinol/aldehyde mol ratios in said resin being from 3:1 to 1:10 and the amount of said resin being from 20% to 60% [by weight of said adhesive] *of the combined weights of said copolymer and said resin.*

9. A laminated article in accordance with claim 8 in which said vinylpyridine is 2-vinylpyridine.

10. A laminated article in accordance with claim 8 in which the said aldehyde is formaldehyde.

11. In laminates, a composition comprising a copolymer of a diene hydrocarbon containing conjugated double bonds and a member of the class consisting of unsubstituted monovinylpyridines and alkyl substituted monovinylpyridines, the said hydrocarbon being present in amounts of 50% to 95% by weight of said copolymer and the vinylpyridine being present in amounts at least 5% by weight of said copolymer in admixture with an infusible polyhydric phenol-aldehyde resin formed from a heat convertible resin previously blended with said copolymer, the amount of said resin being from 20% to 60% [by weight of said adhesive] *of the combined weights of said copolymer and said resin.*

12. A composition in accordance with claim 11 in which said infusible resin is derived from a resorcinol-aldehyde resin.

13. A composition in accordance with claim 11 in which said copolymer is a butadiene/vinyl pyridine copolymer and said infusible resin is derived from a resorcinol-formaldehyde resin.

CHARLES J. MIGHTON.

REFERENCES CITED

The following references are of record in the file of this patent or the original patent:

UNITED STATES PATENTS

| Number | Name | Date |
|---|---|---|
| 1,849,109 | Novotny | Mar. 15, 1932 |
| 2,128,635 | Charch | Aug. 30, 1938 |
| 2,255,834 | Taylor et al. | Sept. 16, 1941 |
| 2,277,941 | Almy | Mar. 31, 1942 |
| 2,291,208 | Brown et al. | July 28, 1942 |
| 2,334,526 | Allison | Nov. 16, 1943 |
| 2,394,375 | Gross | Feb. 5, 1946 |
| 2,402,020 | Cislak | June 11, 1946 |
| 2,405,038 | Jennings | July 30, 1946 |
| 2,429,397 | Compton et al. | Oct. 21, 1947 |

FOREIGN PATENTS

| Number | Country | Date |
|---|---|---|
| 849,126 | France | Aug. 7, 1939 |